US012809337B2

(12) United States Patent
Kim et al.

(10) Patent No.: US 12,809,337 B2
(45) Date of Patent: Nov. 24, 2026

(54) MANUFACTURING INTELLIGENCE SERVICE SYSTEM CONNECTED TO AT LEAST ONE MES IN A SMART FACTORY

(71) Applicant: MIRAE CIT Inc., Seoul (KR)

(72) Inventors: Wontae Kim, Seoul (KR); Dongkwon Kim, Seoul (KR); Sichoon Park, Seoul (KR)

(73) Assignee: MIRAE CIT Inc., Seoul (KR)

( * ) Notice: Subject to any disclaimer, the term of this patent is extended or adjusted under 35 U.S.C. 154(b) by 595 days.

(21) Appl. No.: 17/981,006

(22) Filed: Nov. 4, 2022

(65) Prior Publication Data

US 2023/0152781 A1 May 18, 2023

(30) Foreign Application Priority Data

Nov. 15, 2021 (KR) ........................ 10-2021-0157125

(51) Int. Cl.
*G05B 19/4155* (2006.01)

(52) U.S. Cl.
CPC .................... *G05B 19/4155* (2013.01); *G05B 2219/31372* (2013.01)

(58) Field of Classification Search
None
See application file for complete search history.

(56) References Cited

U.S. PATENT DOCUMENTS

| | | | | |
|---|---|---|---|---|
| 2019/0101903 | A1* | 4/2019 | Katti | G05B 19/4188 |
| 2022/0091576 | A1* | 3/2022 | Ouyang | G05B 19/4063 |
| 2022/0215523 | A1* | 7/2022 | Nunoya | G06T 7/001 |

FOREIGN PATENT DOCUMENTS

| | | | | |
|---|---|---|---|---|
| JP | 2009070319 | A | * | 4/2009 |
| KR | 10-1182768 | B1 | | 9/2012 |
| KR | 10-1688641 | B1 | | 12/2016 |
| KR | 20170069178 | A | * | 6/2017 |
| KR | 10-1772673 | B1 | | 8/2017 |
| KR | 10-2019-0063839 | | | 6/2019 |
| KR | 10-2019-0063839 | A | | 6/2019 |
| KR | 10-2019-0067439 | A | | 6/2019 |
| KR | 102108956 | B1 | * | 5/2020 |
| KR | 20200063340 | A | * | 6/2020 |
| KR | 20210122429 | A | * | 10/2021 |
| KR | 10-2579783 | B1 | | 9/2023 |

OTHER PUBLICATIONS

RFID Inc, "Summary of Frequencies", 2018, https://www.rfidinc.com/rfid-101/frequencies-tutorial/, pp. 1 (Year: 2018).*

* cited by examiner

*Primary Examiner* — David Earl Ogg
(74) *Attorney, Agent, or Firm* — Sughrue Mion, PLLC

(57) ABSTRACT

A manufacturing intelligence service system connected to at least one MES in a smart factory is disclosed. The manufacturing intelligence service system connected to at least one MES includes a Manufacturing Execution System (MES) having a machine vision of a production line in the smart factory to provide the product ID and a product information and a defect information including scratch or defect of a product; a cloud server connected to the at least one Manufacturing Execution System (MES); and an agent server connected to the cloud server, and the cloud server provides the product ID and the product information and product defect information of a connected machine vision production line of a manufacturing company product to the user terminal through the agent server.

8 Claims, 8 Drawing Sheets

Vision inspection method through product defect image remote leatning
Vision system wiring diagram Main functions 1. Machine vision defection system: E xistion machine vision equipment can be adopted only a deep learning vision defect detection module
2. Machine vision interface
3. Deep learning
4. Deep learning determination for detecting defects with a learning model
5. Deep learning relearning
6. The accuracy of determination of the dwwp learning vision inspection

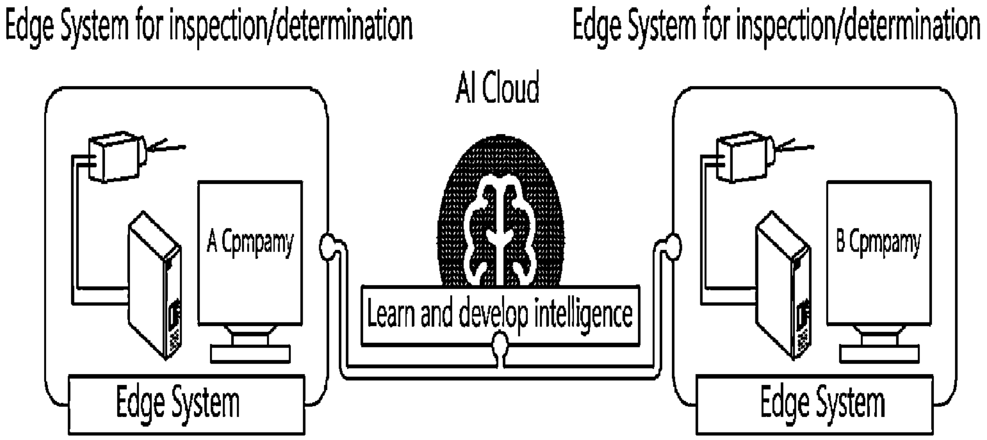

FIG.3

Vision inspection method through product defect image remote learning

Solutions

Machine vision manufacturing intelligence platform

Deep learing machine platform in an existing machine vision inspection equipment 1. Machine vision manufacturing intelligence platform provides a manufacturing intelligence by mounting an AI solution that supports intelligence of edge platform machine vision inspection equipment.

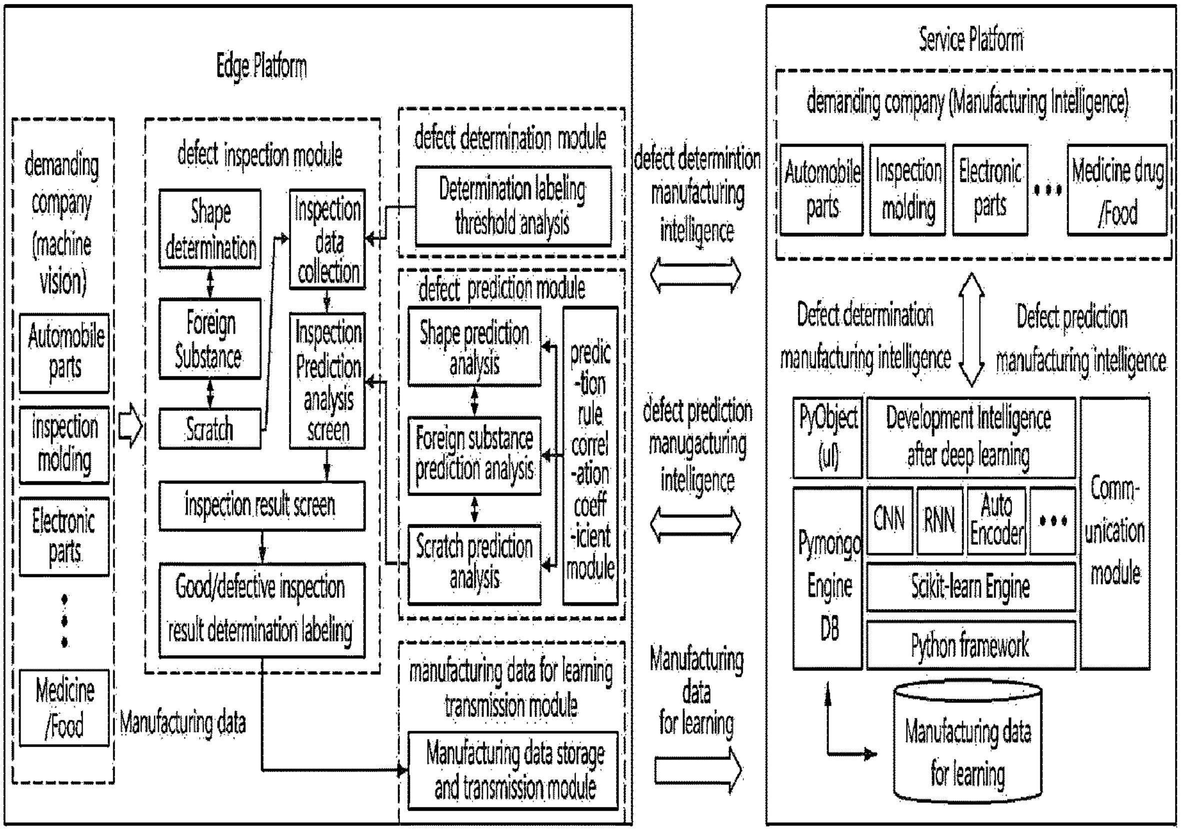

FIG.4

MANUFACTURING INTELLIGENCE SERVICE SYSTEM CONNECTED TO AT LEAST ONE MES IN A SMART FACTORY

CROSS-REFERENCE TO RELATED APPLICATION

This application claims priority to Korean Patent Application No. 10-2021-0157125, filed on Nov. 15, 2021, the disclosures of which is herein incorporated by reference in its entirety.

This invention was supported by a grant of the National IT Industry Promotion Agency (NIPA, No. A1308-22-1008).

FIELD OF THE INVENTION

This invention relates to a manufacturing intelligence service system connected to at least one Manufacturing Execution System (MES) in a smart factory, which provides product identification (ID), product information and defect information of products of each manufacturing company accumulated and stored in a cloud server, from an agent server to a user terminal, through the cloud server connected to the at least one Manufacturing Execution System (MES) having a machine vision inspection system for detecting defects of products in a product surface defect inspection in the factory automation (FA) process of an industrial company.

BACKGROUND OF THE INVENTION

Recently, A machine vision (MV) inspection system is vision-based quality inspection method and system using deep learning in manufacturing process", Korea Electronics Technology Institute (Patent Document 7) Korean Patent Publication No. 10-2019-0067439 (Publication date: Jun. 17, 2019), "Control value setting apparatus and method of semiconductor vision inspection system based on deep learning", Electronics and Telecommunications Research Institute.

SUMMARY OF THE INVENTION

To solve the above-described problems in the related art, and an object of the present invention is to provide a manufacturing intelligence service system connected to at least one Manufacturing Execution System (MES) in a smart factory, which is provided with a cloud server connected to the at least one Manufacturing Execution System (MES) having a machine vision inspection system for detecting defects of products in various fields such as product surface defect inspection or the like in the factory automation (FA) process of an industrial company, and provides a product identification (ID) and a product information and defect information of products of a plurality of manufacturing company products accumulated and stored in the cloud server from an agent server to a user terminal through the cloud server.

To accomplish the above object, according to one aspect of the present invention, there is provided a manufacturing intelligence service system connected to at least one Manufacturing Execution System (MES) in a smart factory, the manufacturing intelligence service system comprising: the at least one Manufacturing Execution System (MES) having a machine vision system of a production line in the smart factory, recognizing a product identification (ID), for providing the product ID, a product information and a defect information including scratch or defect of a product through middleware; a cloud server connected to the at least one Manufacturing Execution System (MES); and an agent server connected to the cloud server, wherein the middleware includes a product code transmission middleware and a deep learning middleware, wherein the agent server is connected to the cloud server and collects the product ID, the product information and the product defect information of a machine vision production line of a manufacturing company product via the agent server and transmitting result data of foreign material existence inspection, shape inspection, and normal/defective determination performed on camera image data from the cloud server to the user terminal via the agent server.

A manufacturing intelligence service system connected to at least one Manufacturing Execution System (MES) in smart factory, which includes a cloud server connected to the at least one Manufacturing Execution System (MES) having a machine vision inspection system for detecting defects of products or product surface defect inspection in various fields such as wafer, display, and PCB defect inspection, LED chip semiconductor package inspection. The cloud server has an effect on providing user with product ID, product information and product defect information of a manufacturing company product accumulated and stored in the cloud server, from the cloud server to the user terminals through the agent server, thereby effectively providing many companies with smart factory manufacturing intelligence service data.

BRIEF DESCRIPTION OF THE DRAWINGS

FIGS. 2*a*, 2*b* and 3 are views showing main functions of a manual vision inspection machine having a camera, a light, and a controller connected to a PC to determine defects of products by detecting defects (foreign substances, or scratches, etc.) of the products.

FIG. 4 is a view showing a machine vision manufacturing intelligence platform using product defect image remote learning by using a deep learning algorithm.

DETAILED DESCRIPTION OF THE INVENTION

Figure 1:
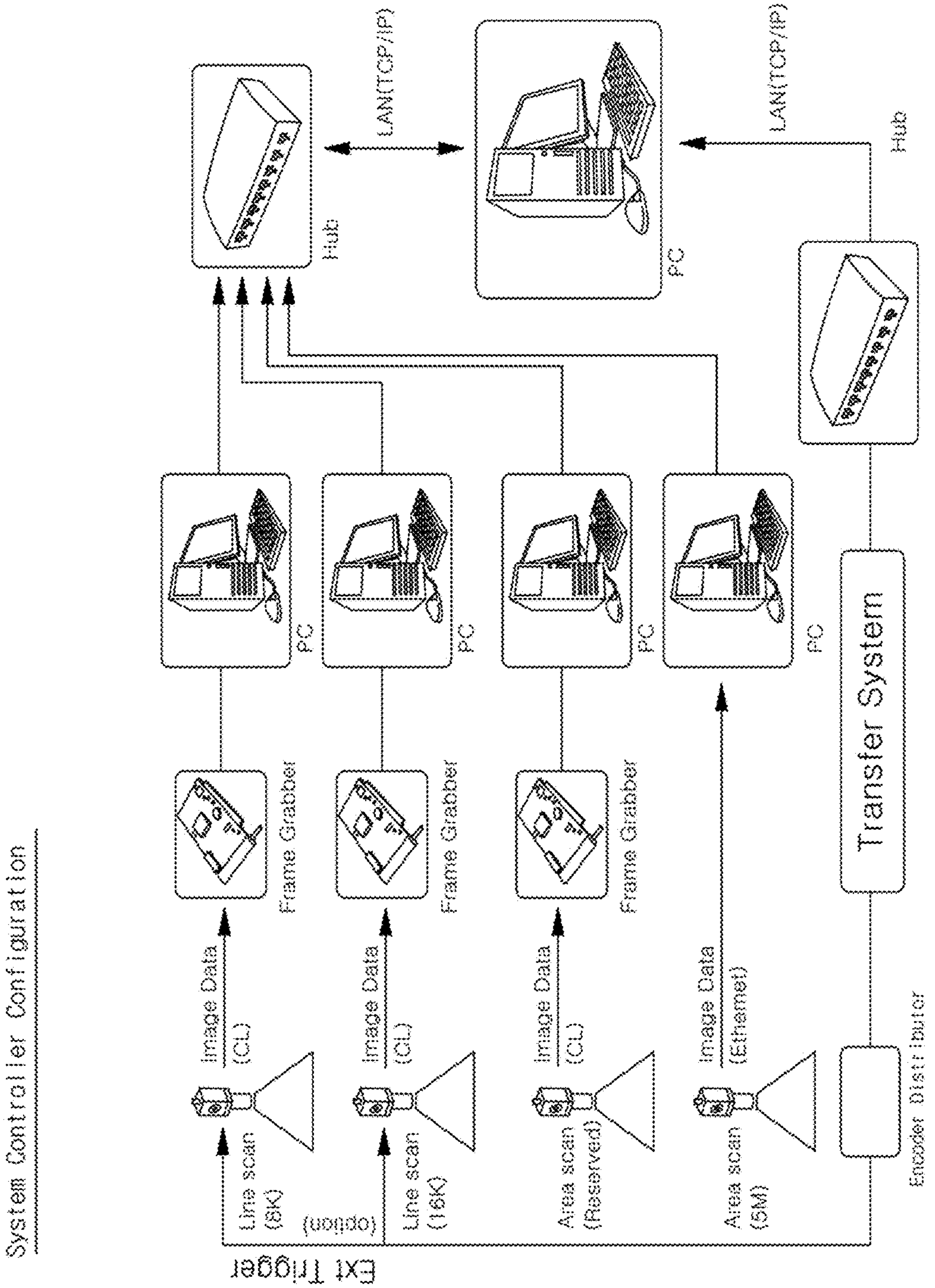
FIG. 1 is a view showing the configuration of a vision inspection system having a sensor, an ID reader, a camera, and an optical light in a conveyor belt production line provided with an encoder.

Hereinafter, preferred embodiments of the present invention will be described in detail with reference to the accompanying drawings. In the description of the present invention, when it is determined that a detailed description of a related known technology or a known configuration may unnecessarily obscure the subject matter of the present invention, the detailed description will be omitted. In addition, when a reference numeral of a drawing indicates the same configuration, the same reference numeral is assigned in different drawings.

A manufacturing intelligence service system connected to at least one Manufacturing Execution System (MES) in a smart factory constructs a smart factory in the factory automation (FA) process of an industrial company, together with one or more manufacturing companies, and through a cloud server connected to the at least one Manufacturing Execution System (MES) having a machine vision inspection system that inspects product surface defects and detects defects of products in various fields, the smart factory manufacturing intelligence service system provides user with product identification (ID), product information and defect information of products of each manufacturing company accumulated and stored in the cloud server from an agent server to a user terminal through the agent server that is connected to the could server connected to the at least one Manufacturing Execution System of each manufacturing company.

Recognition of a barcode, a quick response (QR) code, and a 13.6 MHz radio frequency identification (RFID) tag attached to a product (recognition of product ID)

Alignment of parts in an assembly process, stacking alignment, and product surface defect inspection (machine vision)

Figure 2A:
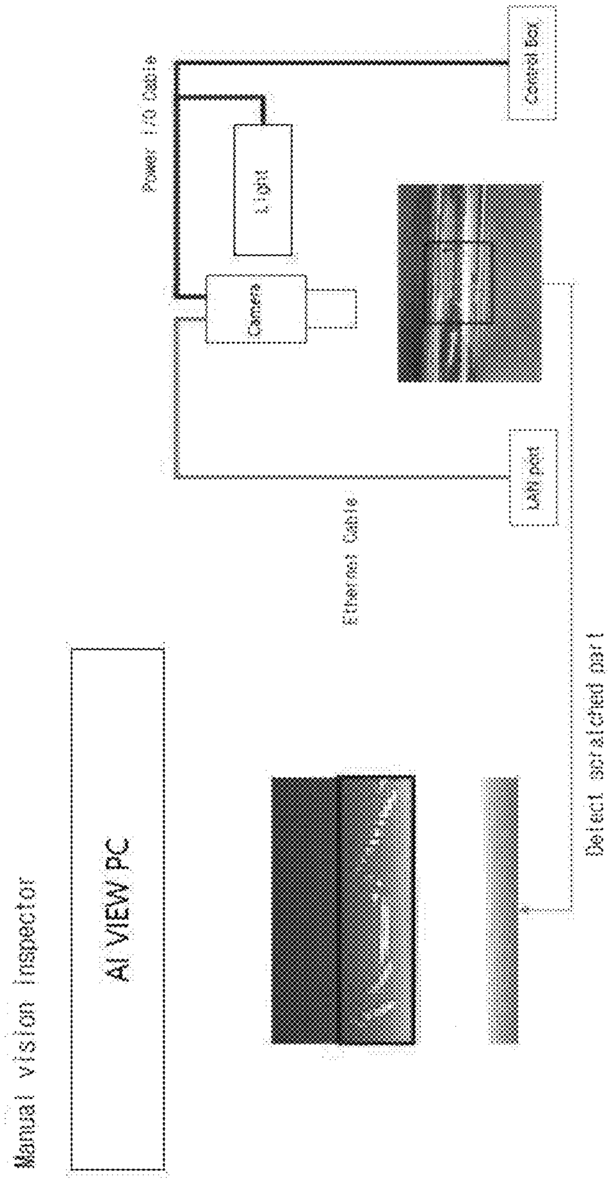
Figure 2B:
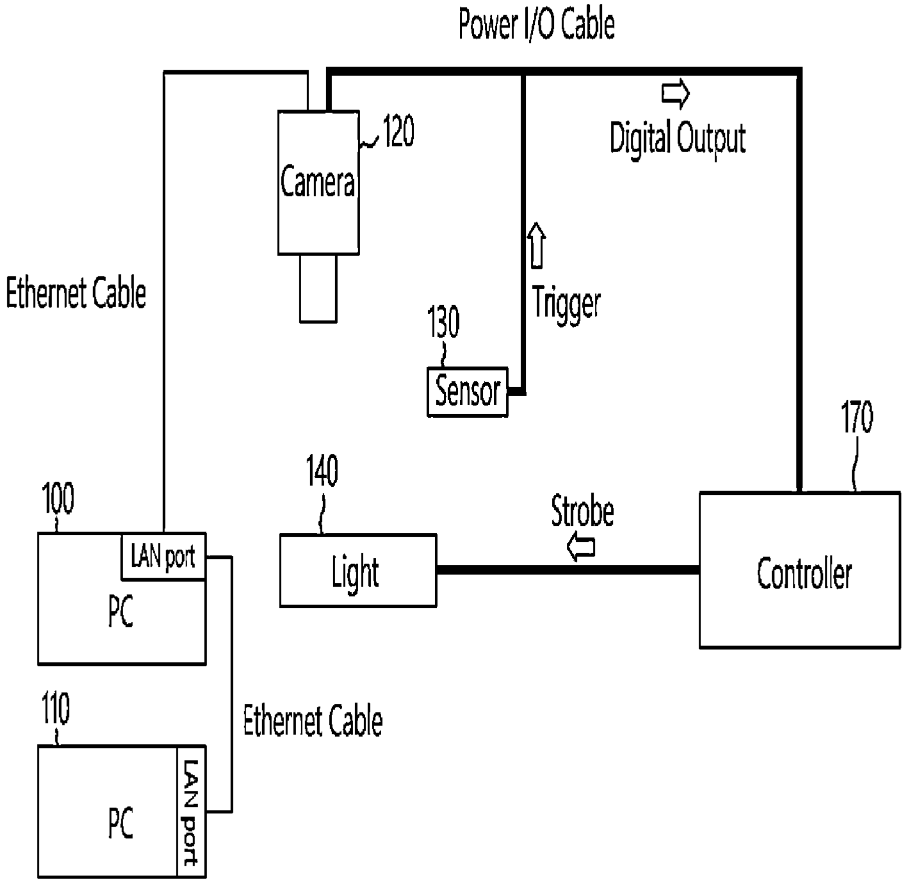

Provide an AI View of vision inspection (stains, scratches), product shape inspection (size defect), and blob inspection (determine whether or not plated) of a personal computer (PC) using sensors and cameras on a deep learning-based machine vision platform FIGS. 2*a* and 2*b* are views showing main functions of a vision inspection machine having a camera, a light, and a controller connected to a PC to determine defects of products by detecting defects (foreign substances, or scratches, etc.) of the products.

Smart Factory Manufacturing Intelligence Service System Connected to MES

1) A deep learning vision inspection function is modularized and inspects a product (normal/defective) in association with an existing machine vision (MV) inspection system. The deep learning algorithm of machine vision image analysis software (SW) uses an CNN algorithm, and uses any one of AlexNet, ZFNet, VGGNet, GoogLeNet, and ResNet.

A deep learning tool uses any one of Tensorflow, Keras, Caffe, and PyTorch.

2) Construct data for deep learning using a test image acquired by the machine vision (MV) inspection system and a determination result for reference.

Main Functions

1. Machine vision defect detection system: When there is existing machine vision equipment, only a deep learning vision defect detection module may be adopted.
2. Machine vision interface: Receives a test sample image and a determination result for reference from existing machine vision equipment.
3. Deep learning: Deep learning is carried out with the received image and the determination result for reference
4. Deep learning determination: Determination is carried out with a learning model generated in 2 for a sample image for detecting defects.
5. Retraining of deep learning: A field worker makes a final determination seeing the determination result of 3 and, and this result is reused as a deep learning material.
6. When the steps are sufficiently performed, accuracy of determining the deep learning vision inspection is enhanced, and the user does not require to separately make a determination.

FIG. 3 is a view showing wiring of a vision system connected to a camera, a light, a control box, a PC, or a PLC.

An AI machine vision inspection system through product defect image remote learning includes a PC 100, a PLC 110, a camera 120, a sensor 130, a light 140, and a controller 170.

The controller 170 is connected to the camera 120, the sensor 130, and the light 140, and the PC 100 connected to the camera 120 may be connected to the PLC 110.

There are provided a camera 120, a light 140, and a controller 170 connected to the PC 100, and a manual vision inspection machine that detects defects of products (foreign materials, scratches, etc.) and determines defective products (defects, scratches, foreign materials, etc.) further includes a sensor 130 for additionally providing a trigger input to the camera 120.

In the AI machine vision system, the lighting 140 may be used a white or red LED light, or a halogen light having an optical fiber guide is used as the light 140, and in an embodiment, an LED light and a light controller are used.

In case of using an LED light, white LEDs arranged in a row and a light controller, or a ring LED including a plurality of LEDs surrounding a camera lens and a light controller is used. The lighting 140 may be used ring LED illumination, top/left-top/top/right-top tilt angle illumination, backlight illumination, or the like.

Additionally, the PC 100 having a deep learning-based vision image processing SW further includes a PLC 110 connected through an Ethernet cable.

The machine vision image analysis SW for the camera image data of the product uses i) grayscale image processing, or ii) a deep learning algorithm, and a grayscale image, an RGB image, an HSI image, a YCbCr image, a JPEG image, a TIFF image, and a GIF image may be applied as the camera image. The deep learning algorithm detects objects having defects of foreign substances and scratches in the camera image data and determines whether the product is defective using any one of Convolutional Neural Network (CNN), Recurrent Convolutional Neural Network (R-CNN), Fast RCNN(Region based Convolutional Neural Network), Faster RCNN(Region based Convolutional Neural Network), You Only Look Once (YOLO), and Single Shot Detector (SSD) algorithms.

The deep learning algorithm of the machine vision image analysis SW detects objects in an image and determines whether the product is defective by using any one of Convolutional Neural Network (CNN), Recurrent Convolutional Neural Network (R-CNN), Fast RCNN(Region based Convolutional Neural Network), Faster RCNN(Region based Convolutional Neural Network), YOLO(You Only Look Once), and SSD (Single Shot Detector) algorithms.

The deep learning algorithm of the machine vision image analysis SW of the edge platform uses a CNN algorithm, and uses any one of AlexNet, ZFNet, VGGNet, GoogLeNet, and ResNet. The deep learning algorithm uses the CNN algorithm to extract and classify features of an image, extract defective objects (foreign substances, defects, or scratches) by comparing the features with the learning data of accumulated defect images of the learning model, and transmit an image containing the defective objects to the service platform, and the service platform determines whether the product is defective.

A barcode, a QR code, or a 13.56 MHz RFID tag is attached to the product, and a barcode reader, a QR code scanner of an industrial PC, or a 13.56 MHz RFID reader is respectively used.

Additionally, the PC may further include a barcode reader and a recognition module for recognizing a barcode attached to a product when the barcode is attached to the product.

Additionally, the PC may further include a QR code recognition module for recognizing a QR code attached to a product when the QR code is attached to the product.

Additionally, the PC may further include a SW module connected to a 13.56 MHz RFID reader through product code transmission middleware when a 13.56 MHz RFID tag is attached to a product.

The middleware includes product code transmission middleware for transmitting information on any one of a barcode, a QR code, and a 13.56 MHz RFID tag corresponding to the extracted model information attached to the product recognized by the barcode reader, the QR code recognizer, or the 13.56 MHz RFID reader to the cloud server; and deep learning middleware provided with a defect determination learning model for receiving defect process data transmitted from the machine vision system and detecting defective images by comparing the defect process data with the defective image learning data (foreign materials, scratches) accumulated and stored by a deep learning model training system, and transmitting data on the result of foreign material existence inspection, shape inspection, and normal/defective determination performed on the camera image data by a deep learning shape determination system and an artificial intelligence (AI) deep learning module to the cloud server.

Additionally, the PC may be connected to a control robot through a robot interface to control movement of the product after performing 2D vision inspection based on deep learning.

FIG. 4 is a view showing a machine vision manufacturing intelligence platform using product defect image remote learning by using a deep learning algorithm.

The machine vision manufacturing intelligence platform supports a deep learning machine vision platform that can quickly respond to a new product and occurrence of an exceptional defect type by making existing machine vision inspection equipment intelligent in a hybrid form. A company that adopts the smart factory solution may secure quality inspection intelligence of products produced in real time.

1. The machine vision manufacturing intelligence platform provides a manufacturing intelligence edge platform to a company by mounting an AI solution that supports intelligence of machine vision inspection equipment that has already been adopted.
2. When an exceptional defect type is generated in the machine vision inspection data (camera image data of a product) of a company that has adopted a smart factory solution or a new product needs to be inspected, the service platform provides manufacturing intelligence to the edge platform by using the deep learning solution.
3. The service platform continuously provides manufacturing intelligence service to enhance intelligence of an existing edge platform by using machine vision manufacturing intelligence through learning of manufacturing common data to similar business types.
4. The machine vision system provides a product inspection platform in accordance with manufacturing intelligence based on learning of defect data in association with the MES system.

The machine vision manufacturing intelligence platform is provided with a service platform connected to the edge platform including a defect inspection module, a defect determination module, and a learning-purpose manufacturing data transmission module through middleware, in which the defect inspection module reads a product ID and provides shape determination inspection/foreign substance inspection/scratch inspection of camera image data, and the service platform provides defect determination manufacturing intelligence and defect prediction manufacturing intelligence, and uses a deep learning algorithm based on the learning data.

The product is attached with any one of a barcode, a QR code, or a 13.56 MHz RFID tag.

Additionally, the PC further includes a barcode reader and a recognition module for recognizing a barcode attached to a product when the barcode is attached to the product.

Additionally, the PC further includes a QR code recognition module for recognizing a QR code attached to a product when the QR code is attached to the product.

Additionally, the PC further includes a SW module connected to a 13.56 MHz RFID reader through product code transmission middleware when a 13.56 MHz RFID tag is attached to the product.

A vision inspection system through product defect image remote learning includes a machine vision inspection system connected to a camera, a sensor, an LED light, and a controller and provided with machine vision image analysis SW, and a reader (barcode reader, QR code recognizer, or 13.56 MHz RFID reader) connected to the computer (PC) of the machine vision inspection system reads a product ID (barcode, QR code, 13.56 MHz RFID tag), and the vision inspection system includes an edge platform of the agent server provided clients with a defect inspection module that provides shape determination inspection/foreign substance inspection/scratch inspection of camera image data of a product, a defect determination module, and a learning-purpose manufacturing data transmission module; middleware connected to the edge platform to interwork with the service platform of the cloud server; and a service platform connected to the edge platform through the middleware to provide defect determination manufacturing intelligence and defect prediction manufacturing intelligence, detect an atypical defective image by comparing with accumulated and stored defective image learning data (training data set of a defective image including foreign substances or scratches), and provide vision inspection through product defect image remote learning using an AI deep learning algorithm that provides result data of foreign substances inspection, shape inspection, and normal/defect determination of camera image data of a product.

The edge platform of the agent server includes a defect inspection module (shape determination inspection, foreign material inspection, scratch inspection, specification information collection based on inspection data, inspection prediction analysis screen, inspection result screen, good/defective inspection result determination labeling storage and transmission), a defect determination module (determination labeling, threshold analysis), a defect prediction module (shape prediction analysis, foreign substance prediction analysis, scratch prediction analysis, prediction rule correlation coefficient module), and a learning-purpose manufacturing data transmission module (manufacturing data storage and transmission module).

The service platform of the cloud connects to a at least one Manufacturing Execution System (MES) and a cloud server shares defect determination manufacturing intelligence, defect prediction manufacturing intelligence, and manufacturing data for learning with the edge platform, and the service platform of the cloud server is provided with a manufacturing intelligence service module that provides development intelligence after deep learning, and includes a Scikit-learn Engine, a CNN, an RNN, an audio encoder, a DB for storing the manufacturing data for learning, and a communication module on the Python framework.

A barcode, a QR code, or a 13.56 MHz RFID tag is attached to a product, and the middleware includes: product code transmission middleware for transmitting information on any one of a barcode, a QR code, or a 13.56 MHz RFID tag of a product recognized by a barcode reader, a QR code recognizer, or a 13.56 MHz RFID reader from cloud server to the user terminal via the agent server having each manufacturing company; and deep learning middleware provided with a defect determination learning model for receiving defect process data transmitted from the machine vision system and detecting defective images by comparing the defect process data with the defective image learning data (foreign substances, or scratches) accumulated and stored by a deep learning model training system in accordance with a vision inspection method through product defect image remote learning, and transmitting data on the result of foreign substance existence inspection, shape inspection, and normal/defective determination performed on the camera image data by a deep learning shape determination system and an AI deep learning module from the service platform of the cloud server to the agent server having each manufacturing company.

The manufacturing intelligence service system further includes an inspection stage located under the camera unit and the optical light unit to place an inspection target on an XY-stage; a base on which the inspection stage is placed; an anti-vibration facility of a vibration reduction air cylinder structure placed under the base; a frame for supporting vision inspection equipment; and a stage unit transfer module for controlling movement of XYZ position.

The camera is connected to a PC through a camera interface (frame grabber, Gigabit Ethernet (GigE), IEEE 1394, camera link, or USB3.0), and the PC is connected to a main server computer through LAN and TCP/IP via a network hub.

Figure 5:
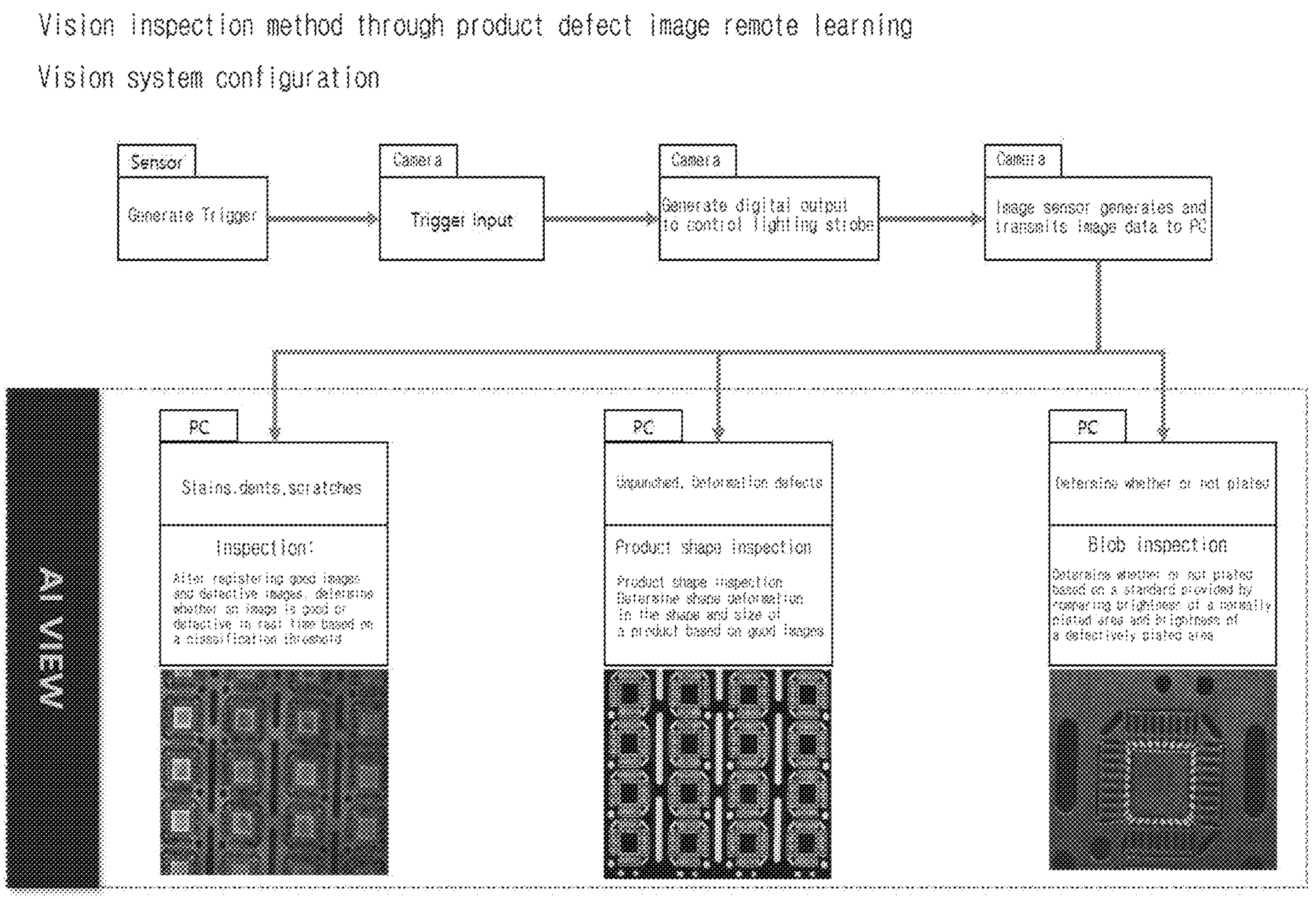
FIG. 5 is a view showing an AI view of vision inspection (stains, or scratches), product shape inspection (unpunched, or size defect), and blob inspection (determine whether or not plated) of a PC by using a sensor and a camera in a deep learning-based machine vision platform in a vision inspection method using product defect image remote learning.

FIG. 5 is a view showing an AI view of vision inspection (stains, dents, or scratches), product shape inspection (unpunched, deformation defect), and blob inspection (determine whether or not plated) of a PC by using a sensor and a camera in a deep learning-based machine vision platform in a vision inspection method using product defect image remote learning.

The sensor generates a trigger input and transmits it to the camera, and the camera generates a digital output by controlling the lighting strobe, and an image sensor generates and transmits image data to the PC.

The PC performs image data inspection (stains, dents, or scratches), product shape inspection (unpunched, and deformation defect), and blob inspection (determine whether or not plated) as needed.

The inspection (stains, dents, or scratches) determines defects of an image in real time based on a classification threshold after registering good and defective images.

The product shape inspection (unpunched, and deformation defect) determines whether or not the shape of a product is changed from the shape and size of a product based on an image of a good product.

The blob inspection (determine whether or not plated) determines whether or not plated based on a standard prepared by comparing brightness of a normal plating area with brightness of a defective plated area.

Referring to the configuration of the machine vision AI system connected to a sensor, a camera, a light, a control box, a PC or a PLC, it is possible to develop and continuously learn product defect determination intelligence on a deep learning-based machine vision platform. The learned intelligence is executed on a deep learning-based machine vision platform to increase the process defect detection rate. Through continuous accumulation of manufacturing data defect detection technology, the machine vision AI system is used as a manufacturing intelligence vision inspection system.

Figure 6:
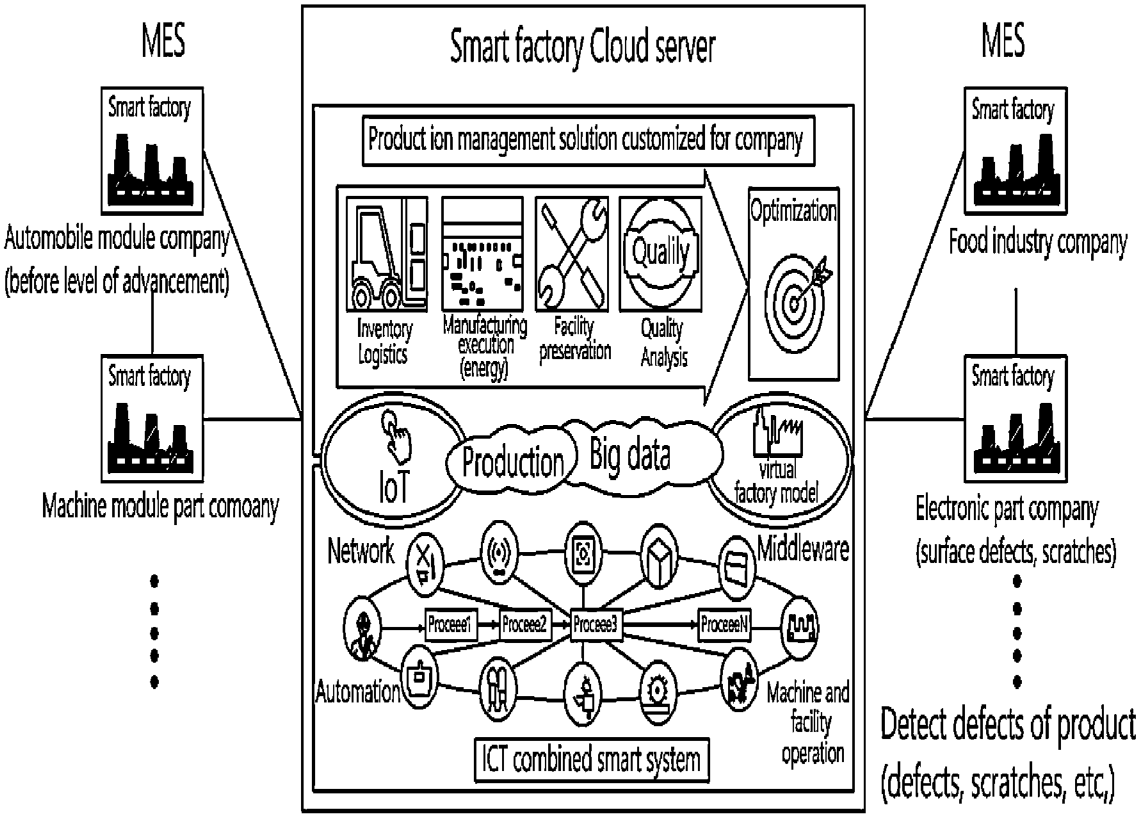
FIG. 6 is a view showing the configuration of a cloud server of a smart factory.

FIG. 6 is a view showing the configuration of a cloud server of a smart factory.

Figure 7:
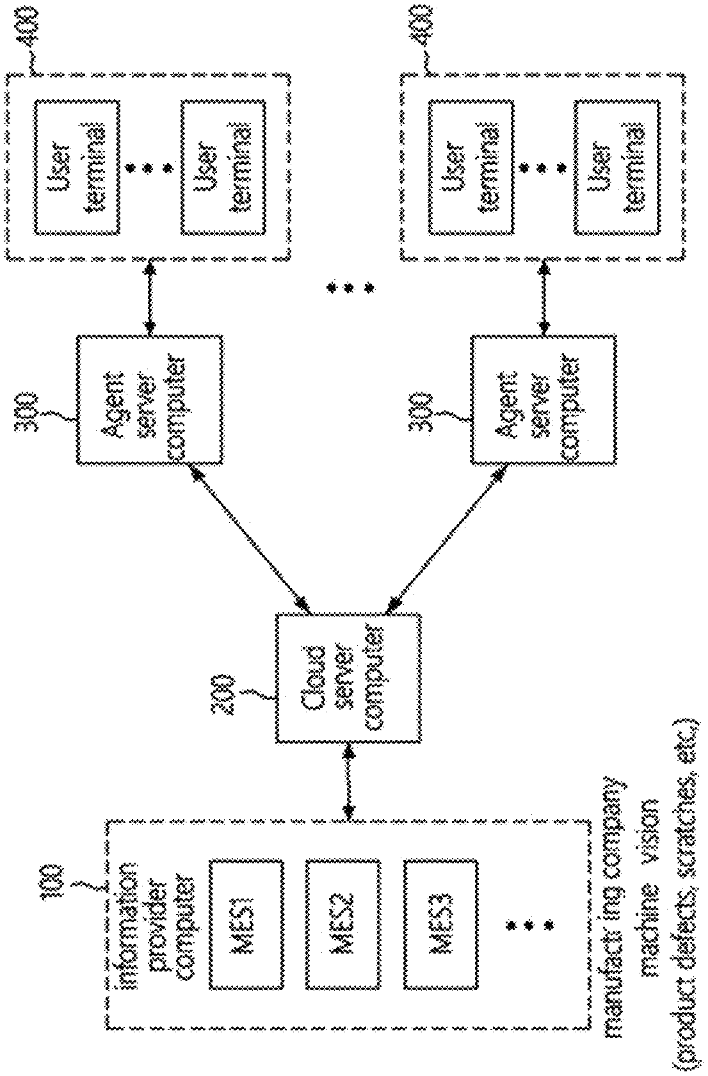
FIG. 7 is a view showing the configuration of a manufacturing intelligence service system connected to an MES in smart factory according to the present invention.

FIG. 7 is a view showing the configuration of a manufacturing intelligence service system connected to an MES in smart factory according to the present invention.

The manufacturing intelligence service system connected to at least one Manufacturing Execution System (MES) in a smart factory constructs a smart factory for the factory automation (FA) process of an industrial company, together with one or more manufacturing companies, and through the cloud server 200 connected to the at least one Manufacturing Execution System (MES) having a machine vision system that detects defects of products in various fields, such as wafer, display, and PCB defect inspection, LED chip semiconductor package inspection, product surface defect inspection, and the like in a semiconductor production line, the manufacturing intelligence service system connected to at least one MES in a smart factory collects product ID, product information and defect information of products of a connected machine vision production line of each manufacturing company accumulated and stored in the cloud server 200 via the agent server and transmitting result data of foreign material existence inspection, shape inspection, and normal/defective determination performed on camera image data and then transmitting result data of foreign material existence inspection, shape inspection, and normal/defective determination performed on camera image data from the cloud server 200 to a user terminal 400 via the agent server 300 that is connected to the cloud server 200 connected to the at least one Manufacturing Execution System of each manufacturing company.

The manufacturing intelligence service system connected to at least one Manufacturing Execution System (MES) in a smart factory according to the present invention includes: the at least one Manufacturing Execution System (MES) 100 having a machine vision system of a production line of each manufacturing company or in the smart factory to recognize a product ID when a barcode, a QR code, or a 13.56 MHz RFID tag is recognized, transmit the product ID through middleware, and provide the product ID, product information and defect information (scratch, or defect) of the product to a cloud server; a cloud server 200 connected to the at least one Manufacturing Execution System (MES) to collect product ID, product information and product defect information of the production line of each Manufacturing Execution System (MES) and provide product ID, product information and the product defect information to the user terminal 400 via the agent server 300 having each manufacturing company; and an agent server 300 connected to the cloud server 200, wherein the middleware includes a product code transmission middleware and a deep learning middleware, wherein the cloud server 200 collects product ID, product information and product defect information of a machine vision production line of a manufacturing company product via the agent server 300 and transmitting result data of foreign material existence inspection, shape inspection, and normal/defective determination performed on camera image data from the cloud server 200 to the user terminal 400 via the agent server 300 that is connected to the cloud server 200 connected to the at least one Manufacturing Execution System of each manufacturing company.

The user terminal 400 uses a personal computer (PC), a laptop computer, a tablet PC, or a smartphone.

A barcode, a QR code, or a 13.56 MHz RFID tag is attached to a product, and information on any one among the barcode, the QR code, or the 13.56 MHz RFID tag attached to a product recognized by a barcode reader, a QR code recognizer, or a 13.56 MHz RFID reader is transmitted from the agent server to the user terminal.

The product is attached with any one of a barcode, a QR code, and a 13.56 MHz RFID tag.

Additionally, the PC further includes a barcode reader and a recognition module for recognizing a barcode attached to a product when the barcode is attached to the product.

Additionally, the PC further includes a QR code recognition module for recognizing a QR code attached to a product when the QR code is attached to the product.

Additionally, the PC further includes a SW module connected through "product code transmission middleware" from a 13.56 MHz RFID reader when a 13.56 MHz RFID tag is attached to the product.

The machine vision determines defects of a product by analyzing defects such as foreign substances, scratches, pattern errors, or the like on the display of a product surface, and locations of the defects through image processing [(1) image acquisition, (2) image binarization, (3) image processing, (4) image analysis, (5) image interpretation] of a vision inspection image processing algorithm of a computer connected through the mechanism unit and the camera interface (Frame Grabber, Gigabit Ethernet (GigE), IEEE 1394, camera link, or USB 3.0) connected to one camera, a line scan camera, or an area scan camera.

The machine vision AI system connected to a sensor, a camera, a light, a control box, and a PC or a PLC may develop and continuously learn product defect determination intelligence on a deep learning-based machine vision platform. Continuously learned intelligence is executed on a deep learning-based machine vision platform to increase the process defect detection rate.

In the initial stage in which a smart factory of each company is not constructed at all, a cloud server connected to at least one Manufacturing Execution System (MES) can be provided information on work management to store raw materials in a warehouse, management to obtain and place an order, production plan, production order, work situation, LOT management, process management, quality management that classifies good/defective products using machine vision (MV), warehousing/releasing/inventory management, and sales performance management can be provided in the manufacturing industry field.

The Manufacturing Execution System (MES) is used for defect management of products for recognizing defects and classifying good/defective products in real-time camera vision inspection monitoring of a manufacturing process.

The encoder measures an exact amount of transfer of a servo motor when a conveyor belt operates in a production line of a factory.

The mechanism unit may further include an inspection target transfer robot for placing an inspection target on the inspection stage (XY stage) by a loader.

The mechanism unit further includes an ID reader for reading a DPM code, a barcode, a QR code, or a 13.56 MHz RFID tag attached to a product as an ID of an inspection target transferred to a conveyor belt of a production line in a factory automation process, or as an ID of a product placed on an inspection stage (XY stage) by the loader of the inspection target transfer robot, and transmitting the detected product ID to the computer.

In the factory automation (FA) process of an industrial company, defect information of products of each manufacturing company, which is accumulated and stored in a cloud server connected to each MES system (MES 1, MES 2, MES 3, . . . ) to provide defect information and manufacturing intelligence information of the products, is transferred and provided from the agent server to the user terminal through the cloud server connected to at least one Manufacturing Execution System (MES) having a machine vision inspection system that detects defects of products in various fields, such as wafer, display, and PCB defect inspection, LED chip semiconductor package inspection, product surface defect inspection, and the like in a semiconductor production line.

The service platform of the cloud server provides defect determination manufacturing intelligence and defect prediction manufacturing intelligence, continuously learns defects of products, and provides vision inspection through product defect image remote learning by using a deep learning algorithm based on the learning data.

The manufacturing intelligence service system connected to at least one MES in a smart factory is provided with a service platform connected to an edge platform including a defect inspection module, a defect determination module, and a learning-purpose manufacturing data transmission module through middleware, in which the defect inspection module reads and transmits a barcode, a QR code, or a 13.56 MHz RFID tag attached to a product with a barcode reader, a QR code recognizer, or a 13.56 MHz RFID reader to a personal computer (PC) through middleware so as to be stored, and reads a product ID and provides shape determination inspection/foreign substance inspection/scratch inspection on camera image data.

The service platform of the cloud server provides defect determination manufacturing intelligence and defect prediction manufacturing intelligence, continuously accumulates and stores defect data, and uses a deep learning algorithm to detect defect data based on the learning data.

In the cloud server, the deep learning algorithm of machine vision image analysis software of each manufacturing company extracts and classifies features of objects in an image to detect defects, receives and stores defect information of a product ID in the cloud server, and shares the defect information, using any one of the algorithms including CNN(Convolutional Neural Network), R-CNN (Recurrent Convolutional Neural Network), Fast RCNN(Region based Convolutional Neural Network), Faster RCNN(Region based Convolutional Neural Network), YOLO (You Only Look Once), and SSD (Single Shot Detector).

For reference, the image analysis SW of the camera image data may use i) grayscale image processing, or ii) a deep learning algorithm. A grayscale image, an RGB image, an HSI image, a YCbCr image, a JPEG image, a TIFF image, or a GIF image may be applied as the camera image. In an embodiment, a grayscale image is used.

i) Grayscale Image Processing

The image analysis SW converts camera image data (RGB image) into grayscale image data, buffers and stores the grayscale image, provides image processing and image analysis functions, converts a region of interest (ROI) into grayscale, obtains a histogram of an image of the region of interest (ROI) using a specific threshold of an image of the region of interest (ROI) [the pixel value of each pixel on the x-axis image, the number (frequency) of pixel values on the y-axis], binarizes the image of the region of interest to 0 and 1 on the basis of the threshold using an Otsu algorithm, performs pre-processing on the image of the region of interest (ROI) through histogram equalization, obtains an x-direction derivative and a y-direction derivative using a Sobel edge operator (Sobel mask) or a Canny edge operator, detects an edge (pixels located at the boundary of the object region and the background region) of the image of the region of interest by convolution of multiplying the pixel values of the image by the weight of the Sobel mask and adding them, detects an outline of defective objects in the generated edge image by applying a specific threshold, and extracts shape features.

When a threshold method using the Otsu algorithm is used, pixel values f(x,y) are separated into an object region and a background region for the input image based on a specific threshold. When the pixel value f(x,y) is greater than the specific threshold, it is determined as a pixel belonging to the object region. On the contrary, when the pixel value f(x,y) is smaller than the specific threshold, it is determined as a pixel belonging to the background region.

ii) Features of Objects in an Image are Extracted and Classified by Using a Deep Learning Algorithm (CNN Algorithm, Etc.), and Defective Objects (Foreign Materials, Dents, Scratches, Etc.) are Extracted by Comparing the Features of Input Image with the Learning Data (Foreign Substances, Scratch, Etc.) of the Defective Image Accumulated and Stored in the Learning Data DB in Accordance with a Learning Model The deep learning algorithm of the machine vision image analysis software extracts features of the objects in an image or detects a defective image (object detection) using any one of the algorithms including CNN (Convolutional Neural Network), R-CNN(Recurrent Convolutional Neural Network), Fast RCNN(Region based Convolutional Neural Network), Faster RCNN(Region based Convolutional Neural Network), YOLO (You Only Look Once), and SSD (Single Shot Detector).

The deep learning algorithm of the machine vision image analysis SW uses a CNN algorithm, and any one of AlexNet, ZFNet, VGGNet, GoogLeNet, and ResNet is used. The deep learning algorithm uses the CNN algorithm to extract and classify features of an image (feature extraction), and extracts defective objects (foreign substances, or scratches) by comparing the features of input image with the learning data of the defective image accumulated and stored in the learning data DB in accordance with the learning model.

A multilayer neural network (MLP) having a multilayer perceptron is composed of an input layer for inputting a camera input image, n hidden layers (Layer 1, Layer 2, Layer 3, . . . ), and an output layer, and detects defective objects (foreign substances, defects, or scratches, etc.) by extracting image features and classifying objects in an image.

The convolutional neural network (CNN) uses three layers including a convolutional layer, a pooling layer, and a fully connected layer (FC layer).

A Deep CNN algorithm reduces the amount of image data by repeating convolution and subsampling by a convolutional layer and a pooling layer respectively while moving a mask (e.g., a 3×3 window, filter) having a weight, extracts features robust to image distortion, extracts a feature map by convolution, and classifies defective objects (foreign substances, or scratches, etc.) detected by the learning model of the neural network.

In the image processing using the CNN algorithm, convolution accomplishes image processing of input image by using a mask having a weight (e.g., 3×3 window, filter), and a sum obtained after putting a mask (e.g., 3×3 window, filter) having a weight in the current input image and multiplying the pixel value of the input image by the weight of the mask while moving the mask having a weight in an input image in accordance with a stride is determined as the pixel value of the output image.

Subsampling is a process of reducing the screen size, and max pooling is performed to select the maximum value of a corresponding area.

The FC layer (Fully Connected Layer) connects to the input terminal of the neural network to classify objects by learning.

Currently, the FC layer is configured of a convolution layer of 5 layers and a fully_connected layer of 3 layers.

The size of the image is reduced as the output of the convolutional layer goes through subsampling by the Max-Pooling Layer, and the output of the Max-Pooling is classified into classes of the objects in the FC layer (Fully Connected Layer).

As a result, in order to extract defective objects in a camera image, a feature map including object location area and type information is extracted by several convolutional layers in the middle of the CNN structure, and the size of the feature map decreases while passing through the pooling layer, and objects are detected by extracting object location area information from feature maps of different sizes, and defective objects (foreign substance, or scratch) are classified by comparing the objects with previously learned data of the learning model.

Feature vector x of an image is extracted from input image I of the camera by using MLP of a multi-layer structure of input layer/hidden layer/output layer or a neural network, and output vector h(x) is calculated from the extracted feature vector x of the image by repeatedly applying function $h_i(h_{i-1})=\max(0, W_i h_{i-1}+b_i)$.

Here, $h_i$ is the i-th hidden feature vector, $h_{i-1}$ is the i-1-th hidden feature vector, $W_i$ is a weight parameter (a constant value) of the neural network circuit, and $b_i$ is the bias value of the neural network circuit.

The input feature vector is set to $h_0=x$, and when a total of L hidden layers exists, $h_1, h_2, \ldots h_L$ are calculated in order, and the final output vector is determined as $h(x)=h_L$. In addition, $h_1, h_2, \ldots h_{L-1}$ are quantities that are not revealed as an output of the system, and are referred to as hidden feature vectors. $_{L-1}$ is the L-1-th hidden feature vector.

The basic structure of the R-CNN extracts Region Proposals, in which objects are presumed to exist, from an input image using a Region Proposal generation algorithm called as Selective Search. Each Region Proposal is formed as an image in a bounding box of a rectangular shape, and object classification is performed through the CNN after making the size of all Region Proposals the same.

The R-CNN slows down the processing speed because one CNN (convolutional neural network) should be executed for every region proposal, and a lot of time is required for machine learning since a model for image feature extraction, a model for classification, and a model for fixing the bounding box should be learned at the same time.

To solve the processing speed problem of the R-CNN, a Fast R-CNN model has been developed. The Fast R-CNN model does not extract features from an input image, but extracts features using RoI Pooling in a feature map that has gone through the CNN.

In the Faster R-CNN, a network that combines a method itself of generating Region Proposals inside the CNN as a network structure is called as Region Proposal Network (RPN). Through the RPN, the layer performing RoI Pooling and the layer extracting the Bounding Box may share the same feature map.

The Fast RCNN receives an entire image and objects, and acquires a feature map of the CNN for the entire image. The ROI (Region of Interest) pooling layer extracts a feature vector of a fixed length from the feature map for each entity. Each feature vector becomes one sequence through the Fully Connected (FC) layer, and outputs probability estimation through Softmax function and the position of the bounding box.

Pooling is a sub-sampling process that may lower the resolution of an image by aggregating the statistics of features at various locations, and improves robustness to image deformation such as rotation, noise and distortion. Two methods of pooling are used maximum pooling and average pooling.

The convolution layer and the pooling layer are repeated in one CNN classifier, and layers of various functions may be added according to the structure. Objects (e.g., foreign substances, scratches, surface defects, etc.) may be classified by applying various classifiers (e.g., SVM classifier) in accordance with the learning data of the learning model to the features extracted through the convolution and pooling process performed on the input image.

The Faster R-CNN extracts features by passing the whole input image through the convolution layer several times, and the RPN and the RoI Pooling Layer share the extracted output feature map. The RPN extracts Region Proposals from the feature map, and the RoI Pooling Layer performs RoI pooling on the Region Proposals extracted by the RPN.

A YOLO(You Only Look Once) model may be used for real-time object recognition of camera image data by using deep learning.

YOLO divides each image into S×S grids (bounding box), calculates reliability of each grid, and classifies the class in a way of viewing the entire image at once by reflecting accuracy when objects in the grid are recognized, and YOLO has performance two times higher than those of other models owing to the simple process. An object class score is calculated to determine whether an object is included in a grid. As a result, a total of S×S×N objects are predicted.

The SSD (Single Shot Detector) model, which is similar to YOLO but shows better performance, has a unique advantage in the balance between the speed and accuracy of detecting objects in an image, and the SSD may detect objects of various scales as it may calculate a feature map by executing CNN on the input image only once.

The SSD is an AI-based object detection algorithm balanced between the speed and accuracy of detecting objects, in which grids for detecting objects in a camera image are displayed. The SSD calculates a feature map by executing a Convolutional Neural Network (CNN) on the input image only once. The SSD is performed CNN to extract the feature map with a 3×3 filter size to predict probability of grids and object classification. The SSD predicts grids after performing CNN. This method may detect objects of various scales.

Manufacturing companies adopt an intelligent machine vision solution for factory automation (FA) process as an edge system, that is the smart factory manufacturing intelligence service system connected to at least one MES performing learning and executing to detect a defect determination and prediction model by using cloud computing in the Manufacturing Intelligence Marketplace (MiraeCIT), thereby providing manufacturing intelligence data from cloud server to user terminals through the agent server.

Embodiments according to the present invention may be implemented in the form of program instructions that can be executed by various computer means and recorded in a computer-readable recording medium. The computer-readable recording medium may store program instructions, data files, and data structures individually or in combination. The computer-readable recording medium may include hardware devices configured to store and execute program instructions in magnetic media such as storage, hard disks, floppy disks, and magnetic tapes, optical media such as CD-ROMs and DVDs, magneto-optical media such as floptical disks, and storage media such as ROM, RAM, flash memory, and the like. Examples of program instructions may include high-level language codes that can be generated by a compiler and executed by a computer using an interpreter, as well as machine language codes. The hardware devices may be configured to operate by one or more software modules to perform the operations of the present invention.

As described above, the method of the present invention may be implemented as a program and stored in a recording medium (CD-ROM, RAM, ROM, memory card, hard disk, magneto-optical disk, storage device, etc.) in a form that can be read using computer software.

Although the present invention has been described with reference to a specific embodiment of the present invention, the present invention is not limited to the same configuration and operation as the specific embodiment to illustrate the technical spirit as described above, and within the limit that does not depart from the technical spirit and scope of the present invention, it can be implemented with various modifications, and the scope of the present invention should be determined by the claims described below.

What is claimed is:

1. A manufacturing intelligence service system connected to at least one Manufacturing Execution System (MES) in a smart factory, the manufacturing intelligence service system comprising:

the at least one Manufacturing Execution System (MES) having a machine vision system of a production line in the smart factory, recognizing a product identification (ID), for providing the product ID and a product information and a defect information including scratch or defect of a product through middleware;

a cloud server connected to the at least one Manufacturing Execution System (MES); and an agent server connected to the cloud server, wherein the middleware includes a product code transmission middleware and a deep learning middleware, wherein the cloud server collects the product ID and the product information and the product defect information of a connected machine vision production line of a manufacturing company product via the agent server and transmitting result data of foreign material existence inspection, shape inspection, and normal/defective determination performed on camera image data from the cloud server to a user terminal via the agent server that is connected to the cloud server connected to the at least one Manufacturing Execution System of each manufacturing company.

2. The manufacturing intelligence service system of claim 1, wherein the user terminal uses a personal computer (PC), a laptop computer, a tablet PC, or a smartphone.

3. The manufacturing intelligence service system of claim 1, wherein the product is attached with any one of a barcode, a quick response (QR) code, and a 13.56 MHz radio frequency identification (RFID) tag.

4. The manufacturing intelligence service system of claim 3, wherein the PC further includes a barcode reader and a recognition module for recognizing a barcode attached to a product when the barcode is attached to the product.

5. The manufacturing intelligence service system of claim 3, wherein the PC further includes a QR code recognition module for recognizing a QR code attached to a product when the QR code is attached to the product.

6. The manufacturing intelligence service system of claim 3, wherein the PC further includes a software (SW) module connected to a 13.56 MHz RFID reader through product code transmission middleware when a 13.56 MHz RFID tag is attached to the product.

7. The manufacturing intelligence service system of claim 1, wherein in the cloud server, a deep learning algorithm of machine vision image analysis software extracts and classifies features of objects in an image to detect defects, receives and stores defect information of a product ID in the cloud server, using any one of algorithms including CNN (Convolutional Neural Network), R-CNN (Recurrent Convolutional Neural Network), Fast RCNN (Region based Convolutional Neural Network), Faster RCNN (Region based Convolutional Neural Network), YOLO (You Only Look Once), and SSD (Single Shot Detector).

8. The manufacturing intelligence service system of claim 1, wherein the middleware includes:

the product code transmission middleware for transmitting information on any one among a barcode, a QR code, or a 13.56 MHz RFID tag recognized by a barcode reader, a QR code recognizer, or a 13.56 MHz RFID reader to the cloud server; and the deep learning middleware provided with a defect determination learning model for receiving defect process data transmitted from the machine vision system and detecting defective images by comparing the defect process data with the defective image learning data including foreign substances, or scratches accumulated and stored by a deep learning model training system, and transmitting result data of foreign material existence inspection, shape inspection, and normal/defective determination performed on camera image data by a deep learning shape determination system and an artificial intelligence (AI) deep learning module to the cloud server.

* * * * *